United States Patent [19]
McKee et al.

[11] Patent Number: 6,023,988
[45] Date of Patent: Feb. 15, 2000

[54] CALIBRATION SYSTEM FOR A POWER SHIFT TRANSMISSION

[75] Inventors: Kevin D. McKee, Naperville, Ill.; Jeffrey S. Milender, Valley City, N. Dak.

[73] Assignee: Case Corporation, Racine, Wis.

[21] Appl. No.: 09/131,578

[22] Filed: Aug. 10, 1998

[51] Int. Cl.[7] ................................................. F16H 59/14
[52] U.S. Cl. ........................................ 74/336 R; 477/155
[58] Field of Search ................................. 477/107, 138, 477/155, 163; 74/336 R

[56] References Cited

U.S. PATENT DOCUMENTS

| | | | |
|---|---|---|---|
| 4,344,499 | 8/1982 | van der Lely et al. | |
| 4,414,863 | 11/1983 | Heino | |
| 4,646,891 | 3/1987 | Braun | |
| 4,855,913 | 8/1989 | Brekkestran et al. | |
| 4,967,385 | 10/1990 | Brekkestran et al. | |
| 4,989,471 | 2/1991 | Bulgrien | 74/336 R |
| 5,224,577 | 7/1993 | Falck et al. | 74/336 R |
| 5,249,658 | 10/1993 | Goeckner | 192/3.58 |
| 5,337,871 | 8/1994 | Testerman | 192/85 R |
| 5,456,647 | 10/1995 | Holbrook | 477/155 X |
| 5,551,930 | 9/1996 | Creger et al. | 477/155 X |
| 5,853,076 | 12/1998 | McKee et al. | 192/87.14 |

FOREIGN PATENT DOCUMENTS

786 609  7/1997  European Pat. Off. .

*Primary Examiner*—Sherry L. Estremsky
*Attorney, Agent, or Firm*—Foley & Lardner

[57] ABSTRACT

A method and system for calibrating at least one clutch in a transmission whereby the incipient engagement pressure of the fluid in the clutch may be determined. Two shafts in the transmission are locked together in mutually incompatible gear ratios thereby preventing their free relative rotation. The output of the clutch is connected to these shafts to prevent its free rotation. The input of the clutch is connected to the engine to cause it to rotate. The clutch is then gradually engaged as the load on the engine is monitored, preferably by measuring changes in the fuel flow rate to the engine. Once the engine load increases a predetermined amount, the system saves the particular valve command signal that produced the incipient engagement pressure and the process ends. The method is preferably performed entirely under microprocessor control, thereby eliminating the need for operator intervention during the process.

20 Claims, 7 Drawing Sheets

CALIBRATION SYSTEM FOR A POWER SHIFT TRANSMISSION

FIELD OF THE INVENTION

The present invention relates to power shift transmissions used in agriculture or construction vehicles. More particularly, the present invention relates to transmissions having a plurality of gears engaged by a plurality of clutches disposed in the transmission. More particularly, it relates to a method for calibrating at least one of two such clutches.

BACKGROUND OF THE INVENTION

Power shift transmissions are commonly employed on agricultural and construction vehicles to allow the selection of gear ratios by selectably engaging clutches internal to the transmission. These clutches are typically fluid clutches actuated by air or a hydraulic fluid. To engage the transmission in a particular gear ratio, these clutches are selectively energized to lock gears to their respective shafts and allow the transmission of power from an engine coupled to an input shaft of the transmission, to the output shaft of the transmission. In contrast to this, a typical automobile with manual transmission engages and disengages gears mechanically, by sliding the gears or linkages between the gears to mechanically fix the gears to their respective shafts. With this kind of mechanical gear engagement, the gears are typically disengaged and spin freely, or they are completely engaged and spin at the same speed as the shaft on which they are mounted. Given this sudden engagement, it is necessary to disengage the transmission from the engine prior to changing gear ratios. This is typically performed by a clutch external to the transmission. In a power shift transmission, in which a plurality of gears are engaged by fluid clutches, a certain gradual engagement can be provided by gradually filling the clutches.

The engagement of all the clutches necessary to engage the transmission in a particular gear ratio must be carefully timed. As a power shift transmission changes from one gear ratio to another, there is a risk that clutch engagement may overlap, in which case the transmission may be simultaneously engaged in two incompatible gear ratio, resulting in severe damage to the transmission. Alternatively, if the first clutches necessary to engage the transmission in the first gear ratio are disengaged significantly prior to the time that the second combination of clutches to engage the transmission in the second gear ratio are engaged, the drive wheels of the vehicle will be momentarily disengaged from the engine. The result is that the vehicle may suddenly stop. Given the high loads on an agricultural vehicle, any significant delay between disengagement and reengagement will cause a noticeable and undesirable "jerk."

To provide for the accurate timing of transmission shifts, the clutches must be periodically calibrated. The calibration may compensate for such factors as changes in hydraulic fluid supply pressure, wear in the clutches themselves, changes in electrical supply voltage, manufacturing tolerances and general aging of the vehicle. To accurately time transmission shifts, the microcontroller regulating the clutch engagements and disengagements must be able to determine the precise moment of clutch engagement. This is particularly a problem for clutches that are controlled by proportional control valves. Proportional control valves are so named because an input signal may be applied to them (typically an electrical signal) that is theoretically proportional to the output signal (typically hydraulic pressure). The arrangement and connection of such valves to hydraulic clutches is known to those skilled in the art. Generally speaking, to engage a clutch connected to a proportional control valve, a gradually increasing (or decreasing, depending upon the valve arrangement) electrical signal is applied to a coil on the valve. This signal applied to the coil causes the coil to generate a magnetic field proportionate to the signal. This proportionate magnetic field, in turn, causes a proportional movement of a valve spool in the valve body, which in turn causes a proportional increase in fluid pressure provided at the outlet of the valve. The valve outlet is hydraulically coupled to the fluid clutch, which in turn experiences a proportional change in its internal hydraulic pressure. The change in clutch hydraulic pressure causes a corresponding proportional change in clutch engagement. Thus, by varying the electrical signal applied to the proportional control valve, one can vary the degree of engagement of the fluid clutch. As mentioned above, wear and age can affect the calibration of the clutch. In general terms, the clutch becomes uncalibrated when a particular electric signal is applied to the valve, the same degree of clutch engagement is no longer provided by the hydraulic clutch. To calibrate a proportional valve, therefore, means re-establishing a known relationship between the electrical signal applied to the valve coil, and the degree of clutch engagement.

Several solutions have been proposed to the problem of clutch calibration. In one prior art embodiment, the output clutches are the final drive clutches in the transmission, the last clutch in the transmission's internal drive chain. In general, the method employed involves fixing the output shaft of the transmission by applying the vehicle brakes, engaging all the clutches necessary to place the transmission in one of its gear ratios (except the output clutch to be is calibrated), measuring the speed of the engine shaft, then gradually incrementing the pressure in the hydraulic clutch. Since the engine is running, and since all of the clutches necessary to engage the transmission in a particular gear ratio are engaged, the input side of the output clutch being calibrated is spinning. Since the vehicle brakes have been applied preventing the output shaft from rotating, and since the clutch is an output clutch, meaning the output of the clutch always rotates at the speed of the output shaft, the output of the clutch is not rotating. Since the input of the clutch is rotating and the output of the clutch is not rotating, when the clutch reaches the point of incipient engagement, and therefore the clutch begins to carry a torque, a torque will be applied to the engine and the engine speed will drop. A torque will be transmitted from the vehicle brakes through the output shaft of the transmission through the output clutch being calibrated through the other gears in the transmission's drive train and finally to the engine. Once the engine speed drops a predetermined amount, the clutch is deemed to be calibrated, and the microprocessor controlling the clutches and performing the calibration will then store a value corresponding to the hydraulic pressure in the clutch. An alternative method of determining the point of incipient engagement is not to lock the output shaft preventing it from rotating by applying the vehicle's brakes, but to release the brakes. The result is that the engine's power at the point of incipient engagement will be transmitted through the transmission and to the vehicle's drive wheels, at which point the vehicle will move or lurch. This movement is sensed by a rotation sensor disposed on the output shaft of the transmission. Alternatively, brakes internal to the transmission may be applied to place a load on the engine. In either case, a value corresponding to hydraulic pressure is recorded and saved for future reference by the microprocessor.

There are several drawbacks to these and similar calibration methods, however. First, the operator must either manually apply the vehicle brakes or locate the vehicle to prevent an unexpected lurch during calibration. Second, since the engine speed is monitored, an engine speed sensor must be provided. Third, the calibration method relies on a predetermined change in engine speed, and predetermined changes in engine speed are not proportional to a predetermined change in load. Therefore, the calibration point determined by the procedure may vary depending upon the base or reference speed of the engine during the calibration process.

Accordingly, it would be desirable to provide a method of calibration that is fully automated and more accurate than those provided in the above references.

SUMMARY OF THE PRESENT INVENTION

A calibration method for an agricultural vehicle is disclosed for an agricultural vehicle having an engine, a governor coupled to the engine to regulate the engine fuel flow rate, a transmission coupled to the engine to couple power from the engine to the ground at a plurality of different gear ratios, the transmission having a drive train including a plurality of gears arranged on a plurality of shafts such that selective engagement of the gears allows the transmission to be engaged in a plurality of gear ratios, the drive train further including a plurality of fluid clutches arranged in the transmission to fix the gears to the shafts in the plurality of gear ratios, at least a first and second of the clutches being disposed to couple at least four of the gears with respect to at least two of the shafts to simultaneously engage the two shafts in two incompatible gear ratios, and a third of the clutches having an input and an output and disposed in drive train between the two clutches and the engine such that the third clutch can selectively engage the engine to at least one of the two shafts, the vehicle further including a plurality of fluid valves coupled to the plurality of clutches, a method for calibrating the third clutch. The method includes the steps of engaging the first and second clutches to fix the at least two shafts in a plurality of incompatible gear ratios, sensing a first value indicative of a reference engine load, after the step of sensing a first value, incrementing a fluid pressure applied to the third clutch, after the step of incrementing, sensing a second value indicative of a current engine load, after the step of sensing a second value, comparing the first value and the second value to determine whether the current engine load exceeds the reference engine load, and repeating the incrementing, sensing a second value and comparing steps until the comparing step indicates that the current engine load exceeds the reference engine load. The method may include the step of coupling the output of the third clutch to one of the at least two shafts, or the step of coupling the input of the third clutch to the engine. The step of incrementing a fluid pressure applied to the third clutch may include the step of changing a pulse width modulated command signal. The step of incrementing a fluid pressure applied to the third clutch may also include the step of changing a potential applied to a voltage follower circuit. The step of sensing a second value may include the step of sensing a value indicative of a fuel flow rate to the engine. The step of sensing a second value may include the step of sensing a value indicative of a speed of the engine.

In accordance with a second embodiment of the invention, an agricultural vehicle calibration system is disclosed including an engine supplied with fuel to generate power, a fuel flow rate sensor disposed to measure an amount of fuel flowing to the engine and to generate a signal indicative thereof, a clutch having a clutch input and a clutch output and adapted to transmit the power from the clutch input to the clutch output when engaged, a load coupled to the clutch output, a controller coupled to the fuel flow rate sensor and the clutch, wherein the controller is configured to incrementally engage the clutch until the clutch reaches a point of incipient engagement as indicated by the fuel flow signal. The controller may be further configured to save a value indicative of the point of incipient engagement.

In accordance with a third embodiment of he invention, an agricultural vehicle is disclosed, including a frame, an engine coupled to the frame, a transmission coupled to the engine and further including a plurality of shafts, a plurality of gears arranged on the shafts, a plurality of clutches coupling the plurality of gears to the plurality of shafts, and a controller coupled to the plurality of clutches and configured to engage at least two of the plurality of shafts in mutually incompatible gear ratios, configured to subsequently and incrementally engage at least one of the plurality of clutches having an input coupled to the engine and an output coupled to the at least two shafts engaged in mutually incompatible gear ratios to a point of incipient engagement, and further configured to subsequently save a value indicative of the point of incipient engagement. The vehicle may also include a fuel flow sensor coupled to the controller and configured to generate a signal indicative of the point of incipient engagement, or a governor coupled to the engine and the controller and configured to generate a signal indicative of the point of incipient engagement.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 1:
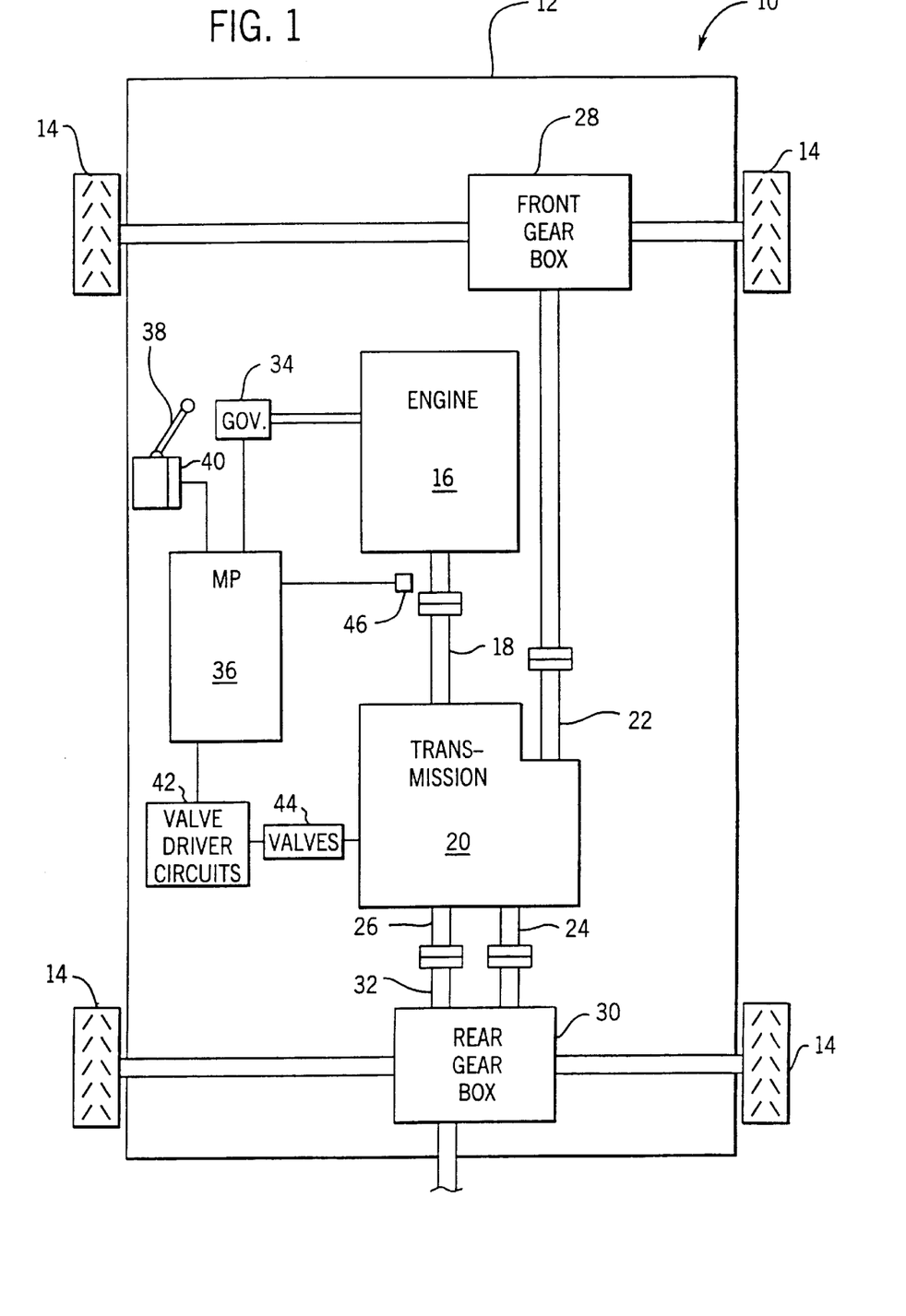
FIG. 1 is a schematic diagram of a vehicle including a vehicle transmission calibration system in accordance with the present invention.

Referring to FIG. 1, a vehicle 10 includes a frame 12 driven over the ground by four drive elements 14. Elements 14 are preferably wheels or tracked suspension systems. An engine 16 is mounted to the frame and is coupled to an input shaft 18 of transmission 20. Output shafts 22, 24 and 26 are coupled to front gear box 28, rear gear box 30, and power take-off shaft 32, respectively. The engine is regulated by a governor 34 adapted to control the fuel flow rate to the engine. The governor in turn is connected to a microprocessor 36 which monitors the governor's operation. A FNRP shift lever 38 and bump lever 39 are coupled to gear shift switches 40 which in turn are connected to inputs of microprocessor 36. In this manner, the microprocessor can monitor the position of the levers to control transmission engagement and disengagement. Microprocessor 36 is coupled to and drives valve driver circuits 42 which in turn are coupled to and drive the solenoid coils of valves 44. Valves 44 in turn are coupled to and regulate the flow of hydraulic fluid to clutches (not shown) in transmission 20. Microprocessor 36 is also coupled to sensor 46 via a databus which provides the microprocessor with a signal indicative of the speed of the engine.

The output of engine 16 is connected to the input shaft of transmission 20 to transmit power into the transmission. By selectively energizing fluid clutches disposed within the transmission (explained in more detail in FIGS. 2 and 3 hereto), several different reduction gear ratios can be provided at the output shafts of the transmission. Output shaft 22 is coupled to front gear box 28 which in turn is coupled to the front drive elements of the vehicle. These elements, here shown as wheels, drive the vehicle across the ground. Output shaft 24 of transmission 20 is coupled to the input shaft of rear gear box 30, which in turn is coupled to rear drive elements 14 which drive vehicle 10 over the ground. Output shaft 26 is connected to PTO shaft 32 which extends outside vehicle 10 and allows engine 16 to drive a variety of implements.

The operation of the transmission is controlled by microprocessor 36, which monitors various signals indicative of the vehicle status such as gear shift lever 38,. governor 34 and sensor 46. Microprocessor 36 also controls the operation of the transmission by applying signals to driver circuits 42 which in turn control valves 44 which in turn control the operation of fluid clutches and transmission 20. In this manner, microprocessor 36 can control the engagement and disengagement of the transmission, the shifting of transmission clutches, and the calibration of transmission clutches. Microprocessor 36 is preferably an Intel 80C198 microprocessor.

Governor 34 controls the operation of engine 16. In particular, governor 34 by sensing certain engine parameters, such as engine speed and fuel flow rate, regulates the flow of fuel to engine 16 to maintain engine 16 at a constant speed. Governor 34 is preferably an "Encore" or "Advanced Heavy Duty" governor sold by Cummins. When an operator of the vehicle changes the engine speed by moving a throttle lever (not shown), the governor senses this change in throttle position and increases the fuel flow rate to the engine. The engine, in turn, increases its speed until it reaches the speed/load curve of the throttle lever. When a load is placed on the engine, the governor senses this increased load and increases the fuel supplied to the engine accordingly. As a load is removed from engine 16, the governor senses this reduced load and reduces the fuel supplied to the engine accordingly. This changing fuel flow rate, among other parameters, is continually provided by the governor to microprocessor 36. Whenever microprocessor 36 executes an instruction that requires the fuel flow rate, it merely reads in the current value of fuel flow rate that is supplied by the governor.

Sensor 46 may be any one of a variety of common sensors known to those skilled in the art for measuring rotational velocity. Pulsations produced by the engine's alternator may also be summed over a predetermined time interval by the microprocessor to provide a value proportional to engine speed. Alternatively, the microprocessor may calculate the time interval between successive alternator pulses. This time interval bears a reciprocal relationship to engine speed and thus can be used to determine engine speed. Sensor 46 is coupled to microprocessor 36.

Figure 2:
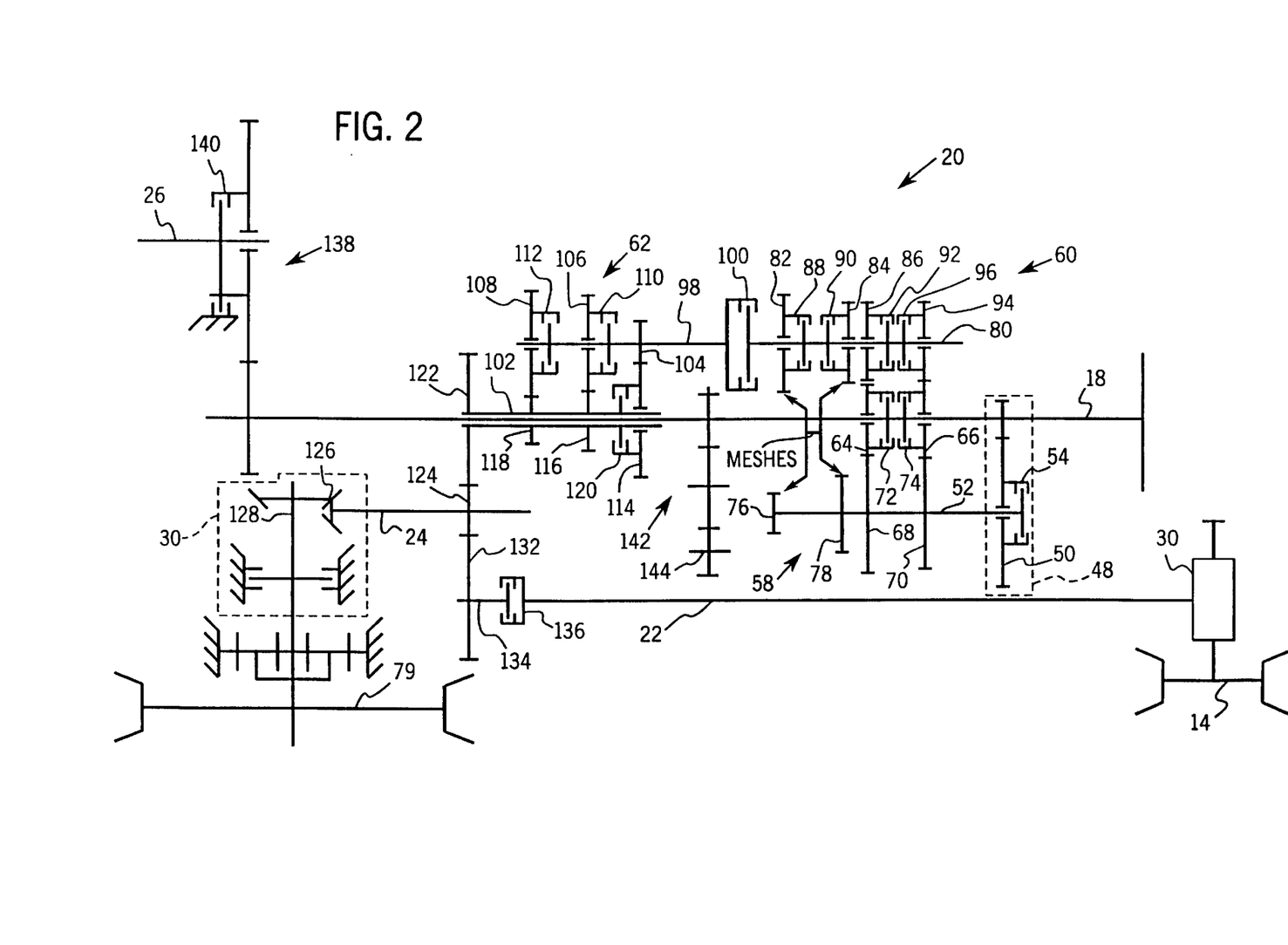
FIG. 2 is a schematic diagram of a first transmission having a clutch to be calibrated.

FIG. 2 illustrates a first embodiment of transmission 20. Transmission 20 is a power shift transmission, wherein several sets of gears are associated with transmission shafts and certain of the gears may be selectively rotationally fixed with respect to their shafts by engagement of an associated fluid clutch to define desired gear ratios between input shaft 18, and output shafts 22 and 24. A fixed gear ratio is maintained between input shaft 18 and output shaft 26 which is coupled to PTO shaft 32 of FIG. 1. In the transmission illustrated in FIG. 2, input shaft 18 is driven in rotation by engine 16. Gear sets, along with associated fluid clutches and transmission shafts permit a number of different gear ratio combinations to be defined for driving transmission output shaft at desired speeds as follows.

A creeper in gear set 48 includes a creeper gear 50 mounted on and rotational with respect to a second transmission shaft 52. A creeper clutch 54 is engageable to lock creeper gear 50 against rotation on shaft 52. Creeper gear set 48 also includes a gear 56 fixed to shaft 18 and continuously meshing with creeper gear 50. Engagement of creeper clutch 54 results in driving shaft 52 through gears 56 and 50 to obtain an extremely slow output speed of shaft 24. Creeper gear set 48 may be optionally excluded from transmission 20.

Transmission 20 includes three groups of gear sets identified in FIG. 2 by the referenced numerals 58, 60 and 62. The first group 58 includes first and second gears 64 and 66 supported on and rotational with respect to shaft 18. Additional gears 68 and 70, fixed on second shaft 52 mesh continuously with gears 64 and 66, respectively. Fluid clutches 72 and 74 are associated with gears 64 and 66, respectively, and may be engaged to lock their associated gear against rotation on shaft 18. In operation either clutch 72 or clutch 74 is engaged to obtain an input-to-output gear ratio, or both clutches may be released or disengaged to interrupt the transmission of power to shaft 52. In the preferred embodiment shown, gear combination 64 and 68 define a ratio 34:39, while gears 66 and 70 have a ratio of 37:37.

Second gear set group 60 includes gear 68 as well as additional gears 76 and 78, all fixed on second shaft 52, supported on a third transmission shaft 80 and rotational with respect to third shaft 80, three gears 82, 84 and 86 mesh continuously with gears 76, 78 and 68, respectively (actual meshing is not shown in FIG. 2). Fluid clutches 88, 90 and 92 are associated with gears 82, 84 and 86, respectively, and may be engaged to lock the associated gear against rotation on shaft 80. Thus, either one of clutches 88, 90 or 92 may be engaged to transmit power between second shaft 52 and third shaft 80 or all of the clutches may be released to interrupt power transmission between the shafts. In the preferred embodiment illustrated, gear combinations 76 and 82 provide a gear ratio of 29:44, combination 78 and 84 provide a ratio of 34:39, and combination 68 and 86 provide a ratio of 39:34.

A reverse gear set is provided adjacent to second gear set group 60 on shaft 80 and includes a reverse gear 94 mounted on and rotational about shaft 80. A reverse clutch 96 is associated with reverse gear 94 and may be engaged to lock reverse gear 94 against rotation with respect to shaft 80, placing transmission 20 in one of several reverse gear ratios.

Third shaft 80 is aligned with and may be selectively coupled to a fourth transmission shaft 98 via a master clutch 100. Thus, when master clutch 100 is fully engaged shaft 98 rotates at the same speed and in the same direction as shaft 80. As discussed below, master clutch 100 is preferably modulated into and out of engagement by driving the solenoid coil with an analog current driver circuit coupled to the master clutch valve solenoid coil. Alternatively, a pulse-width-modulated signal, such as by pulse-width-modulating a proportional control valve. However, master clutch 100 may be mechanically or electromechanically modulated.

Third gear set 62 selectively couples shaft 98 with a further shaft 102 disposed about shaft 18. Third gear set group 62 includes a first gear 104 fixed to shaft 98 and a pair of gears 106 and 108 supported on and rotational with respect to shaft 98. Clutches 110 and 112 are associated with gears 106 and 108, respectively, and may be engaged to lock the associated gear against rotation on shaft 98. Gears 104, 106 and 108 mesh continuously with corresponding gears 114, 116 and 118, respectively, on shaft 102. Gear 114 is supported on and rotational with respect to shaft 102, whereas gears 116 and 118 are fixed to shaft 102. A fluid clutch 120 is associated with gear 114 and may be engaged to lock gear 114 against rotation on shaft 102. Thus, by selectively engaging either clutch 110, 112 or 120, shaft 102 is caused to rotate at a predetermined speed ratio as shaft 98 is driven in rotation. In the presently preferred embodiment, gear combination 104 and 114 provide a gear ratio of 22:54, combination 106 and 116 provide a ratio of 37:39, and combination 108 and 118 provide a ratio of 52:24.

Shaft 102 transmits power to transmission output shaft 24 through gears 122 and 124 fixed on shafts 102 and 24, respectively, and arranged to continuously mesh with one another. As illustrated in FIG. 2, output shaft 24 transmits power to rear gear box 30 which contains bevel gears 126 arranged to drive a differential input shaft 128. A master brake 130 is provided on shaft 128 for braking vehicle 10. In addition to driving rear gear box 30, in the preferred embodiment illustrated in FIG. 2, gear 124 carried by output shaft 24 meshes with a further gear 132 supported on a front wheel drive clutch shaft 134. A front wheel output shaft 22 may be selectively coupled to clutch shaft 134 by front wheel drive clutch 136, and extends to front gear box 28 for driving front drive element 14.

In addition to the gearing described above, transmission 20 is preferably arranged for driving power take off shaft 26 via power take off gearing 138, including power take off clutch 140. Transmission 20 also includes gearing, designated generally by the referenced numeral 142, for driving a hydraulic pump drive shaft 144.

The clutches contained in transmission 20 are preferably fluid operated clutches. Such clutches are typically biased in a disengaged position and engageable by the application of pressurized fluid. Clutches 72, 74, 88, 90, 92, 96, 110, 112 and 120 in the presently preferred embodiment are engaged by hydraulic valves that are either on or off, and are operated by shifting them directly between pressure transmitting ("on") and pressure relieving ("off") positions. Such valves are not calibrated to determine the point of incipient engagement, since they are not proportionally engaged in the preferred embodiment. Master clutch 100, however, is coupled to a proportional control valve and is the clutch that is calibrated according to the calibration method described herein.

By engaging combinations of clutches, transmission 20 establishes a number of predetermined gear ratios between input shaft 18 and output shaft 24. In particular, for the transmission illustrated in FIG. 2, the following gear ratios are provided (the prefixes F, R, C and CR representing forward, reverse, forward creeper and reverse creeper gear ratios, respectively) that are numbered here in order of increasing gear ratios:

TABLE 1

| Gear Ratio | Clutches Engaged |
| --- | --- |
| F1 | 72, 88, 120 |
| F2 | 74, 88, 120 |
| F3 | 72, 88, 120 |
| F4 | 74, 90, 120 |
| F5 | 72, 90, 120 |
| F6 | 74, 92, 120 |
| F7 | 72, 88, 110 |
| F8 | 74, 88, 110 |
| F9 | 72, 90, 110 |
| F10 | 74, 90, 110 |
| F11 | 72, 92, 110 |
| F12 | 74, 92, 110 |
| F13 | 72, 88, 112 |
| F14 | 74, 88, 112 |
| F15 | 72, 90, 112 |
| F16 | 74, 90, 112 |
| F17 | 72, 92, 112 |
| F18 | 74, 92, 112 |
| R1 | 72, 96, 120 |
| R2 | 74, 96, 120 |
| R3 | 72, 96, 110 |
| R4 | 74, 96, 110 |
| C1 | 54, 88, 120 |
| C2 | 54, 90, 120 |
| C3 | 54, 92, 120 |
| C4 | 54, 88, 110 |
| C5 | 54, 90, 110 |
| C6 | 54, 92, 110 |
| CR1 | 54, 96, 120 |
| CR2 | 54, 96, 110 |

Each subcolumn in the second column of the above chart identifies a group of clutches required to engage the transmission in any gear ratio. These combinations of clutches are compatible. The first group (first column) includes clutches 72, 74 and 54. The second group (second column) includes clutches 88, 90, 92 and 96. The third group (third column) includes clutches 110, 112 and 120. Furthermore, for forward gear ratios, only one clutch of each gear set group 58, 60, 62 is engaged. Similarly, for reverse gear ratios, the reverse gear clutch 96 is engaged along with a clutch from the first and third gear set groups 58 and 62. Moreover, for creeper gear ratios, the creeper clutch 54 is engaged along with a clutch from the second gear set group 60 (or the reverse gear clutch 96) and a clutch from the third gear set group 62. For transmission of power through transmission 20, all the gear combinations require the engagement of master clutch 100.

There are several clutches in the transmission of FIG. 2 that cannot be simultaneously engaged. For example, only one of clutches 110, 112 and 120 can be engaged to allow the transmission of torque to output shaft 24. The engagement of any two of these clutches will result in shafts 98 and 102 being locked together in mutually incompatible gear ratios. For example, if clutches 110 and 112 are engaged, gears 106 and 108 will be fixed to shaft 98. Gear 108 meshes continuously with gear 118 and gear 106 meshes continuously with gear 116. Gears 118 and 116 are fixed with respect to shaft 102. By engaging both the clutches 110 and 112, shafts 98 and 102 would be engaged in a gear ratio of 37:39 (gear combination 106 and 116) simultaneously with a ratio of 52:24 (gear combination 108 and 118). Similarly, if clutches 110 and 120 were simultaneously engaged, shafts 98 and 102 would be simultaneously engaged in a gear ratio of 37:39 (gear combination 106 and 116) and a ratio of 22:54 (gear combination 104 and 114). Other clutch combinations that would provide the engagement of two shafts in mutually incompatible gear ratios include clutch pair 88 and 90, clutch pair 88 and 92, clutch pair 90 and 92, clutch pair 72 and 74 and clutch pair 92 and 96. This list is instructive and not exhaustive. Other combinations would follow inherently from FIG. 2 and the description of the FIG. 2 embodiment above.

Figure 3:
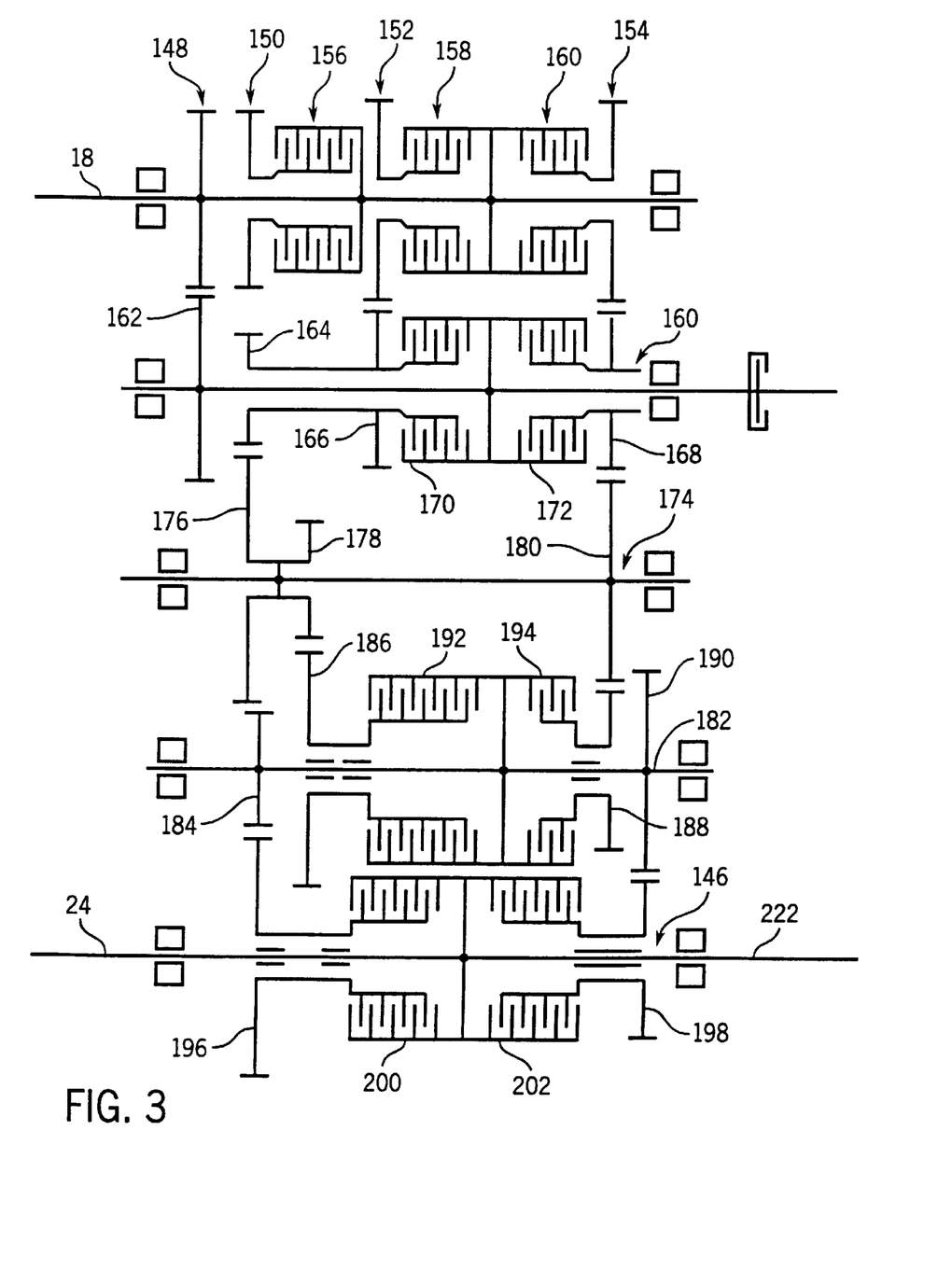
FIG. 3 is a schematic diagram of a second transmission having a clutch to be calibrated.

FIG. 3 discloses a second embodiment of transmission 20 having an input shaft 18, an output shaft 22 and an output shaft 24. Output shaft 26 is provided coupled to transmission 20 via PTO clutch 27, and output shafts 22 and 24 are both fixed to and rotate simultaneously with internal transmission shaft 146. Regarding input shaft 18, gear 148 is fixed on shaft 18, gears 150, 152 and 154 are supported on and rotational with respect to shaft 18. Fluid clutches 156, 158 and 160 are associated with gears 150, 152 and 154, respectively, and may be engaged to lock their associated gear against rotation on shaft 18. Regarding shaft 160, gear 162 is fixed on shaft 160. Gears 164, 166 and 168 are supported on and rotational with respect to shaft 160. Fluid clutch 170 is associated with gears 164 and 166 and may be engaged to lock these gears against rotation on shaft 160. Fluid clutch 172 is associated with gear 168 and may be engaged to lock gear 168 against rotation on shaft 160. Gears 148, 152 and 154 mesh continuously with gears 162, 166 and 168, respectively. Although not shown in FIG. 3, gear 150 also continuously meshes with gear 176 which provides for the two reverse gear ratios. Gear combination 150 and 176 have a ratio of 51:46. Gear combinations 148 and 162 have a ratio of 46:41. Gear combination 152 and 166 have a ratio of 50:37. Gear combination 154 and 168 have a ratio of 50:37. Regarding shaft 174, gears 176, 178 and 180 are fixed on shaft 174. Gears 164 and 168 mesh continuously with gears 176 and 180, respectively. Gear combination 164 and 176 has a ratio of 30:46. Gear combination 168 and 180 has a ratio of 37:39. Regarding shaft 182, gears 184 and 190 are fixed on shaft 182. Gears 186 and 188 are supported on and rotational with respect to shaft 182. Fluid clutches 192 and 194 are associated with gears 186 and 188, respectively, and may be engaged to lock their associated gear against rotation on shaft 182. Gears 178 and 180 mesh continuously with gears 186 and 188, respectively. Gear combination 178 and 186 has a ratio of 21:52. Gear combination 180 and 188 has a gear ratio of 39:48. Regarding shaft 146, gears 196 and 198 are supported by and rotational with respect to shaft 146. Fluid clutches 200 and 202 are associated with gears 196 and 198, respectively, and may be engaged to lock their associated gear against rotation on shaft 146. Gears 184 and 190 mesh continuously with gears 196 and 198, respectively. Gear combination 184 and 196 has a ratio of 26:52 and gear combination 190 and 198 has a ratio of 42:38.

The clutches contained in the embodiment of transmission 20 in FIG. 3 are preferably fluid operated clutches. Such clutches are typically biased in a disengaged position and engageable by the application of pressurized fluid. Clutches 156, 158, 160, 170, 172, 194, 200 and 202 in the presently preferred embodiment are engaged by hydraulic valves that are either on or off, and are operated by shifting them directly between pressure transmitting ("on") and pressure relieving ("off") positions. While these valves are preferred, proportional control valves may also be coupled to these clutches to allow gradual engagement.

By engaging combinations of clutches, transmission 20 establishes a number of predetermined gear ratios between input shaft 18 and output shaft 24. In particular, for the transmission illustrated in FIG. 3, the following gear ratios are provided (the prefixes "F" and "R" representing forward and reverse gear ratios, respectively) that are numbered here in order of increasing gear ratios.

TABLE 2

| Gear Ratio | Clutches Engaged |
|---|---|
| F1 | 170, 192, 200 |
| F2 | 158, 192, 200 |
| F3 | 172, 192, 200 |
| F4 | 160, 192, 200 |
| F5 | 170, 194, 200 |
| F6 | 170, 192, 202 |
| F7 | 158, 194, 200 |
| F8 | 156, 192, 202 |
| F9 | 172, 194, 200 |
| F10 | 172, 192, 202 |
| F11 | 160, 194, 200 |
| F12 | 160, 192, 202 |
| F13 | 170, 194, 202 |
| F14 | 158, 194, 202 |
| F15 | 172, 194, 202 |
| F16 | 160, 194, 202 |
| R1 | 156, 192, 200 |
| R2 | 156, 194, 200 |

Each subcolumn in the second column of the above chart identifies a group of clutches required to engage the transmission in any gear ratio. The first group (first column) includes clutches 156, 158, 160, 170 and 172. The second group (second column) includes clutches 192 and 194. The third group (third column) includes clutches 200 and 202. For any gear ratio, only one clutch of each group is engaged. Engaging more than one clutch from each group may result in at least two shafts of the transmission being engaged to each other in mutually incompatible gear ratios. For example, if both of clutches 192 and 194 are engaged, shaft 174 and shaft 182 will be engaged in mutually incompatible gear ratios. In particular, gear 178 fixed to shaft 174 will be engaged with gear 186 fixed to shaft 182. This gear ratio, as described above, is 21:51. Simultaneously with the two shafts being engaged in this gear ratio, gear 180 on shaft 174 and gear 188 on shaft 182 will also be engaged. The gear ratio of gear combination 180 and 188 is 39:48. In this manner shafts 174 and 182 will be engaged in two mutually incompatible gear ratios. Similarly, if clutches 200 and 202 are both engaged, gears 196 and 198 will be fixed to shaft 146 and will mate with gears 184 and 190 of shaft 182, respectively. The ratio of gear combinations 184 and 196 is 26:52. The ratio of gear combinations 190 and 198 is 42:38.

Thus, shafts 182 and 146 will similarly be engaged in two different gear ratios. Shafts 18 and 160 can similarly be engaged into mutually incompatible gear ratios. Since shafts 18 and 160 are fixed to gears 148 and 162, respectively, they always mesh and rotate in a gear ratio of 46:34. If clutches 158 and 170 are engaged, gears 152 and 166 will be fixed to shafts 18 and 160, respectively. Since gears 152 and 166 are engaged in a ratio of 50:37, this would result in shafts 18 and 160 being engaged into mutually incompatible gear ratios. Similarly, if clutches 160 and 172 are engaged, gears 154 and 168 will be fixed to shafts 18 and 160, respectively. Since gears 154 and 168 mesh with a gear ratio of 50:37, this would also result in shafts 18 and 160 being engaged into mutually incompatible gear ratios.

As with the transmission of FIG. 2, the above list is instructive and not exhaustive. One skilled in the art can identify from the schematic diagram of FIG. 3 numerous other combinations that will similarly engage two or more shafts in mutually incompatible gear ratios.

Figure 4:
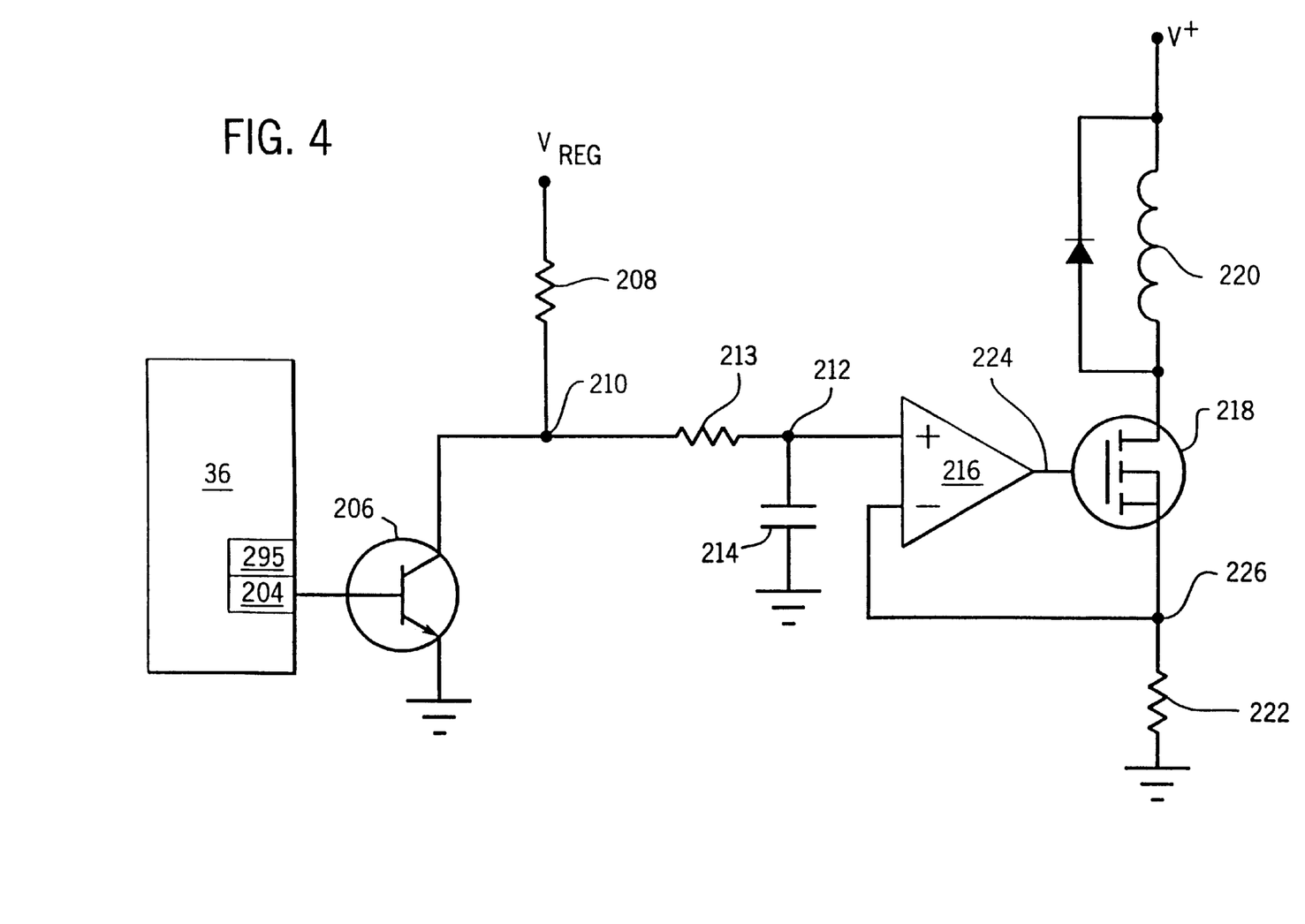
FIG. 4 is a schematic diagram of a proportional valve driver circuit for driving the clutch to be calibrated.

FIG. 4 illustrates a detailed schematic representation of a proportional control valve driver circuit and valve. Microprocessor 36 has a high speed output port 204 coupled to a small signal transistor 206. Small signal transistor 206 acts as a switch conducting current from the vehicle voltage supply (V+) to a resistor 208 to ground. High speed output port 204 is adapted to provide a pulse width modulated signal to small signal transistor 206 that can vary from 0 to 100% on in up to 1000 increments. The PWM signal generated by high speed output port 204 is called the "valve command signal." Small signal transistor 206 is switched at the same frequency that the pulses are generated by the high speed output port. The effect of this switching is to alternately raise the potential at node 210 to about V+ (the regulated system potential) when transistor 206 is turned off and to reduce the potential at node 210 to about zero when transistor 206 is turned on. Thus, high speed output port 204 causes a pulse width modulated signal to appear at node 210.

Resistor 213 and capacitor 214 low pass filter the potential developed at node 210 to provide a constant potential at node 212. The constant potential at node 212 is substantially proportional to the amount of "off" time of transistor 206 which in turn is substantially the same as the amount of time high speed output port 204 is generating a logic "0". Thus, the circuit converts the pulses generated at 204 to a constant voltage value at node 212. Operational amplifier 216 has an input connected to node 212 as shown in FIG. 4. The output of op amp 216 is coupled to and drives transistor 218. Transistor 218 acts as a switch for the relatively high currents that pass through proportional control valve coil 220. Transistor 218 is preferably a field-effect transistor or a Darlington. When transistor 218 is turned on, current flows from unregulated battery voltage V+ through coil 220 through transistor 218 and through sense resistor 222 to ground.

A feedback path is provided from the input side of resistor 222 to a second input of op amp 216 as shown. The addition of this feedback path makes op amp 216 act as a "voltage follower." In other words op amp 216 will automatically generate at node 224 the current or potential necessary to drive the potential at node 226 to the potential at node 212. In this manner, the potential at node 226 "follows" the potential at node 212. Since the potential at node 226 is proportional to the current passing through sense resistor 222, the current passing through transistor 218 and thus through proportional control valve coil 220 is substantially proportionate to the pulse width generated by high speed output port 204. It should be noted that the circuit shown here is preferred for each clutch in the FIGS. 2 and 3 transmissions that are controlled by proportional control valves.

Figure 5:
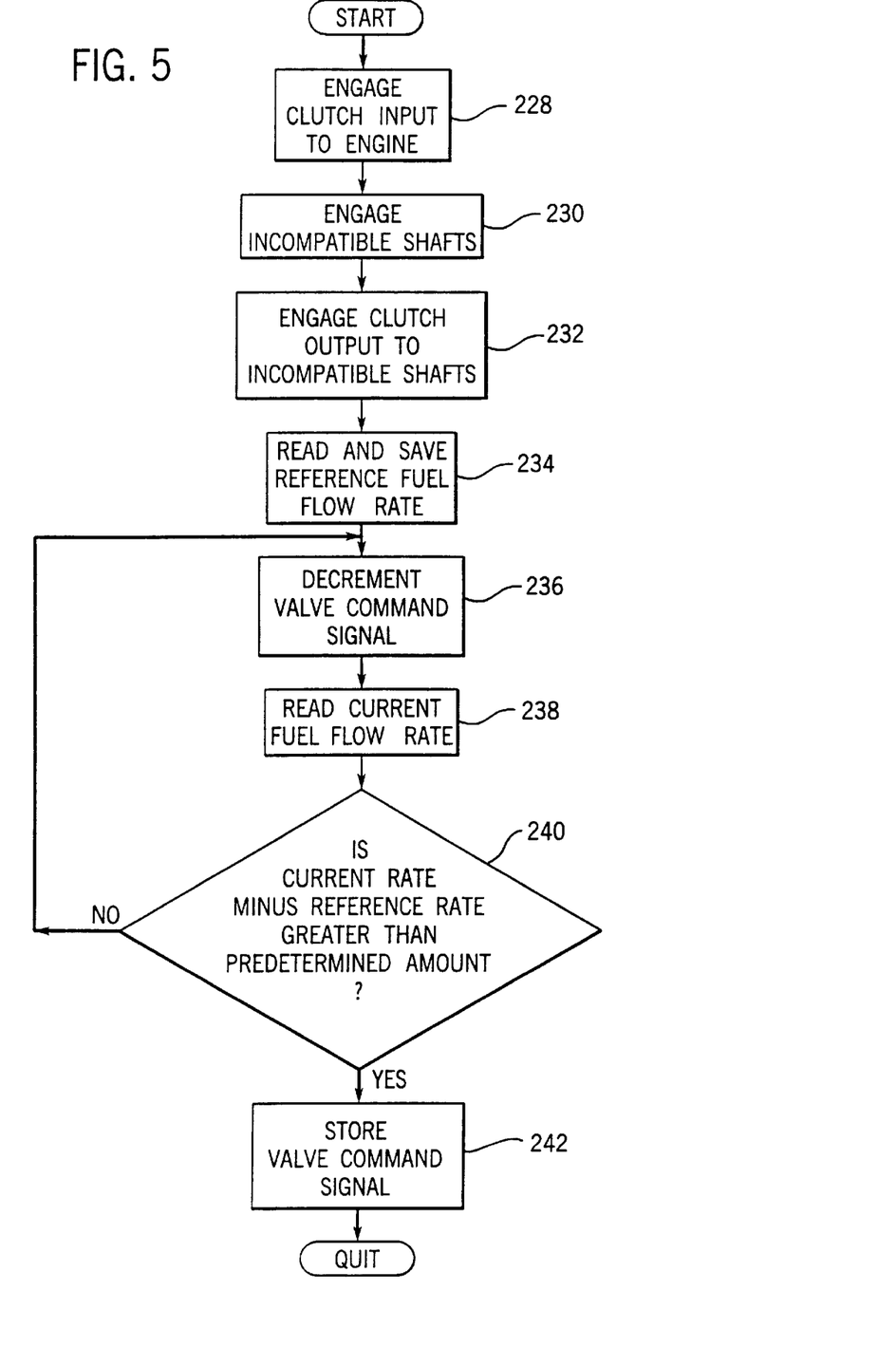
FIG. 5 is a flow chart of instructions executed by the microprocessor of FIG. 1 to calibrate a clutch.

FIG. 5 is a block diagram of a computer program executed by microprocessor 36 in order to calibrate clutches either in the transmission of FIG. 2 or the transmission of FIG. 3. The clutches normally calibrated are clutch 100 in FIG. 2 and clutch 192 in FIG. 3.

The first step in the calibration process (block 228) is to engage the calibrated clutch input to the engine. In the FIG. 2 embodiment, this can be achieved by engaging clutches 96 and 74 to fix gears 66 and 94 to shafts 18 and 80, respectively. These two gears are in continuous mesh, therefore shaft 18 which is coupled to the engine and shaft 80 which is coupled to the input of clutch 100 rotate together. This allows the engine to transmit torque to the input of clutch 100. Other clutch combinations may also be employed in the FIG. 2 transmission to engage the engine to the input of clutch 100.

In FIG. 3, the clutch that is calibrated is clutch 192. In this embodiment clutch 170 may be engaged to couple the engine to the input side of clutch 192. When clutch 170 is engaged, torque is transferred from the engine to gear 148 which continuously meshes with gear 162 through clutch 170 to gear 164 which continuously meshes with gear 176 which is fixed to shaft 174 and transmits torque to gear 178 which continuously meshes with gear 186 which is coupled to the input of clutch 192. In this manner, torque is transmitted from the engine through gears 148, 162, 164, 176, 178 and 186 to the input of clutch 192.

In some embodiments, the clutch being calibrated may be rotationally fixed to the engine and therefore the engagement of the clutch input to the engine need not be performed by the microprocessor engaging one or more clutches since the condition always exists.

In block 230, at least two incompatible shafts downstream in the transmission gear train from the output of the clutch being calibrated are engaged in two mutually incompatible gear ratios. In the FIG. 2 embodiment, at least two of clutches 110, 112 and 120 must be engaged. This will engage shaft 98 and shaft 102 in two incompatible gear ratios as explained above. In the FIG. 3 embodiment, clutches 200 and 202 are engaged to lock gears 196 and 198 to shaft 146. Since gears 196 and 198 mesh continuously with gears 184 and 190, this engages shaft 182 and 146 into incompatible gear ratios.

In block 232, the system engages the output of the clutch being calibrated to the shafts that were previously engaged in block 230 in two mutually incompatible gear ratios. In both the FIGS. 2 and 3 embodiments, one of the shafts selected to be engaged in a mutually incompatible gear ratio with another shaft is rigidly fixed to the clutch output (clutch 100 in FIG. 2 and clutch 192 in FIG. 3) and, therefore, this step is not performed by the microprocessor. If, however, clutch 172 was to be calibrated according to this method. Clutches 200 and 202 would be engaged to lock shaft 182 and 146 together and the step of engaging the clutch output to incompatible shafts would be performed by engaging clutch 194 which in turn would fix gear 188 to shaft 182. Gear 188 continuously meshes with gear 180 which continuously meshes with gear 168 which is fixed to the output of clutch 172. In this manner, the engagement of clutch 194 would engage the output of clutch 172 to shafts 182 and 146, which would be locked together in mutually incompatible gear ratios.

In block 234 the microprocessor reads and saves a reference fuel flow rate. This step is performed by reading a fuel flow value indicative of the full flow rate to the engine that is supplied by governor 34 and saving that value in the electronic memory.

In block 232 the microprocessor decrements the valve command signal. Referring back to FIG. 4, when signal generated by port 204 is decremented, the "off" or logic 0 time of successive pulses provided by port 204 is increased. This increases the "off" time of small signal transistor 206 which in turn results in an increased potential at node 212 and, therefore, node 226 as well. Thus, decrementing the valve command signal results in an incremental increase in the current flowing through valve coil 220 and an incremental increase in the clutch hydraulic pressure. Thus, when the on time of the high speed output port 204 is decremented, the result is an incremental increase in the fluid pressure in the hydraulic clutch being calibrated. Each additional decrement of the on time of the valve command signal results in successive fractional increases in the hydraulic pressure in the clutch being calibrated.

In block 238, the microprocessor reads a value indicative of the current fuel flow rate that is supplied by governor 34.

In block 240 the microprocessor compares the current fuel flow rate value to the reference fuel flow rate value to determine whether the current fuel flow rate value exceeds the reference fuel flow rate value by a predetermined amount. If the current fuel flow rate value does exceed the reference fuel flow rate value by the predetermined amount, the microprocessor stores the current valve command signal in memory, preferably a nonvolatile random access memory or a EEPROM. During subsequent shifts, the microprocessor uses this value to properly sequence the engagement and disengagement of clutch 100 in FIG. 2 or clutch 192 in FIG. 3.

In the event the current fuel flow rate value does not exceed the reference fuel flow rate value by a predetermined amount in block 240, the calibration routine does not continue to block 242, but branches and executes blocks 236, 238 and 240 until the current fuel flow rate value does exceed the reference fuel flow rate value by a predetermined amount at which point block 242 is executed and the calibration process terminates.

Figure 6:
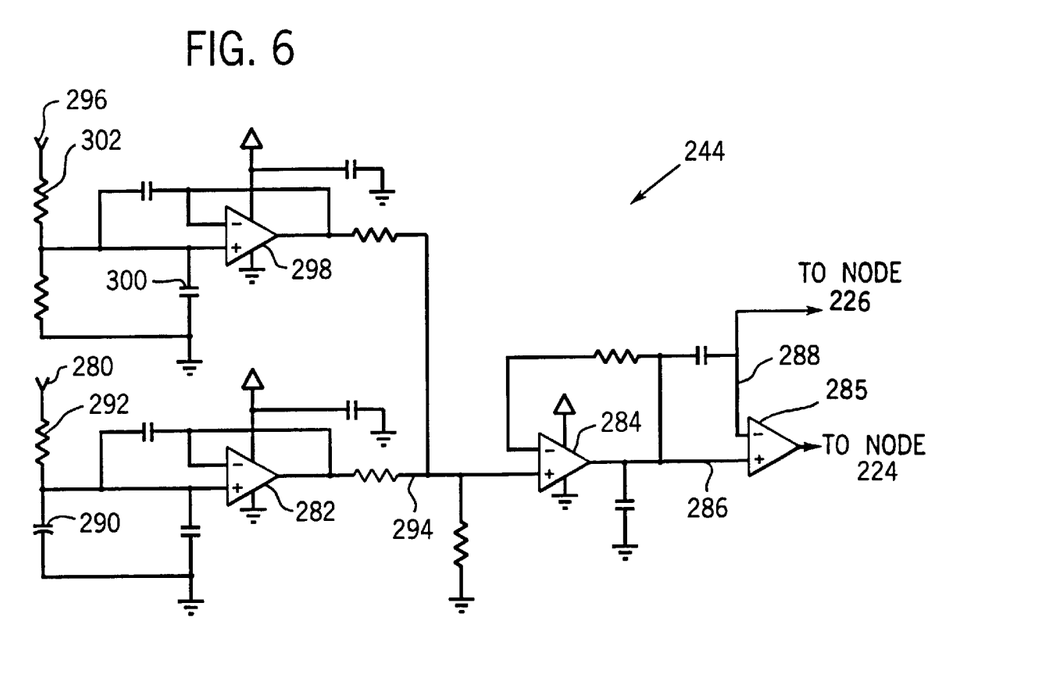
FIG. 6 is a schematic diagram of a proportional drive valve circuit for driving the clutch to be calibrated that generates a signal including a direct current component and an oscillating component.

The valve driver circuit of FIG. 4 provides for the control and calibration of one or more clutches, in particular the master clutches. An improved valve driver circuit may be used that provides superior sensitivity, however, by compensating for friction in the valve that fills the clutch or clutches that are being calibrated. In a preferred embodiment that valve is the valve controlled by valve coil 220 in FIG. 4. Such an improved valve driver circuit 244 is shown in FIG. 6.

Spool-type hydraulic valves are the type most commonly used to fill the hydraulic clutches of transmission 20. Friction exists between the valve spools and the valve body in which they are enclosed. This friction prevents small changes in the valve command signal, and thus small changes in the current flowing through valve coil 220 from making corresponding small changes in valve position, and thus corresponding small changes in master clutch pressure. Friction in the valves often presents problems by preventing the valve from responding to small changes in applied current. Once the changing current reaches a certain threshold, however, the force applied by the solenoid coil to the valve spool overcomes the frictional force keeping the valve spool in its previous position, and the valve suddenly moves to a new position. Valve friction results in what is often called a "dead band" or "hysteresis."

Figure 7:
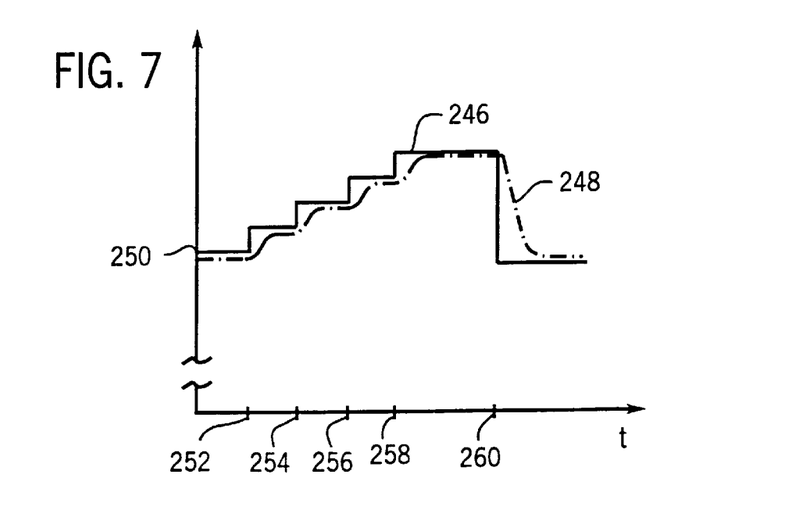
FIG. 7 illustrates the operation of an ideal friction free clutch valve and a valve command signal in response to a valve command signal generated using the circuit of FIG. 4.
Figure 8:
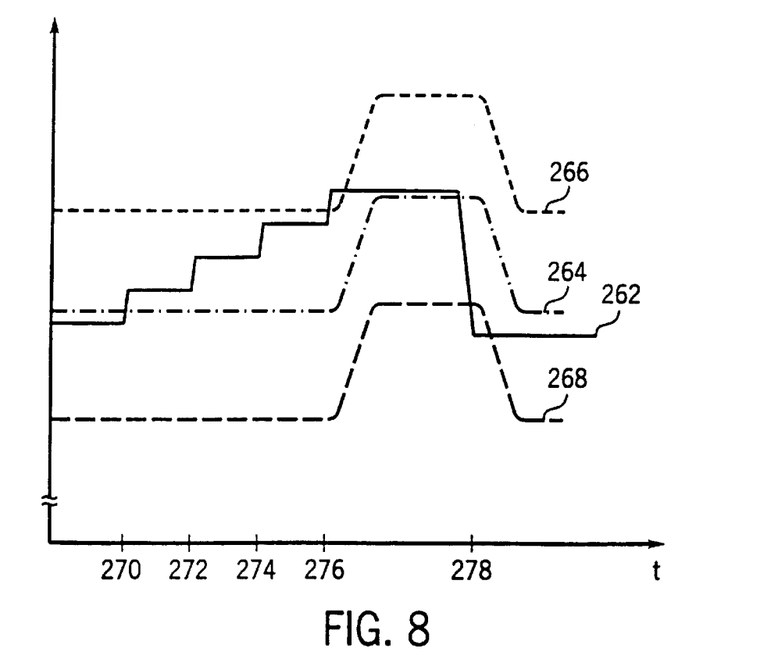
FIG. 8 illustrates the operation of a clutch valve subject to friction in response to the same valve command signal shown in FIG. 7.

FIG. 7 illustrates the operation of an ideal friction-free valve, and FIG. 8 illustrates the change in function of that valve due to valve friction. FIG. 7 is a graph of the valve command signal and the valve position of a theoretical friction free valve that is driven by the valve driver circuit of FIG. 4. Line 246 shows the command signal applied to the valve. Line 248 shows the valve position. At each of times 252, 254, 256 and 258 the valve command signal increases slightly. The valve position tracks these small increases and changes slightly although not immediately due to the inertia of the valve. As the valve position changes, the pressure applied by the valve to the proportionally controlled clutch will also increase slightly. At time 260 the valve command signal drops significantly. As with the increases in valve position at times 252, 254, 256 and 258, the valve position again tracks this drop and the valve closes significantly.

FIG. 8 shows a graph of the same valve command signal, and its effect on a real valve subject to significant friction. Line 262 shows the valve command signal applied to the valve. Dashed and dotted line 264 shows the actual valve position and hence the pressure applied to the clutch. Dashed line 266 shows the upper valve dead band limit, and dashed line 268 shows the lower valve dead band limit.

As with the example of FIG. 7, the valve command signal is increased slightly at times 270, 272, 274 and 276. The valve position does not increase with the increasing valve command signal, but remains constant until the change in the valve command signal at time 276, at which time the valve position suddenly changes. The valve changes position suddenly because the friction acting on the valve spool is finally overcome by the force generated by the applied solenoid current. This threshold is called the upper valve dead band limit, and is shown in FIG. 8 as dashed line 266. The threshold at which the valve command signal is able to overcome the valve friction and close the valve is called the lower valve dead band limit, and is shown in FIG. 8 as dashed line 268. At time 278, the valve command signal reaches this threshold and the valve closes. As long as the valve command signal is between the upper and lower limits, the valve will not change in position. Only when the valve command signal travels outside these limits will the current through the valve solenoid generate enough force to overcome friction acting on the valve spool and move the valve spool.

The circuit of FIG. 6 applies an improved signal to the valve solenoid that compensates for the valve deadband. It simultaneously applies a signal that includes a constant voltage component (similar to that provided by the FIG. 4 circuit) and a fluctuating voltage component unique to the FIG. 6 valve driver circuit. This fluctuating component superimposed on the constant voltage component of the valve command signal serves to compensate for valve friction.

Figure 9:
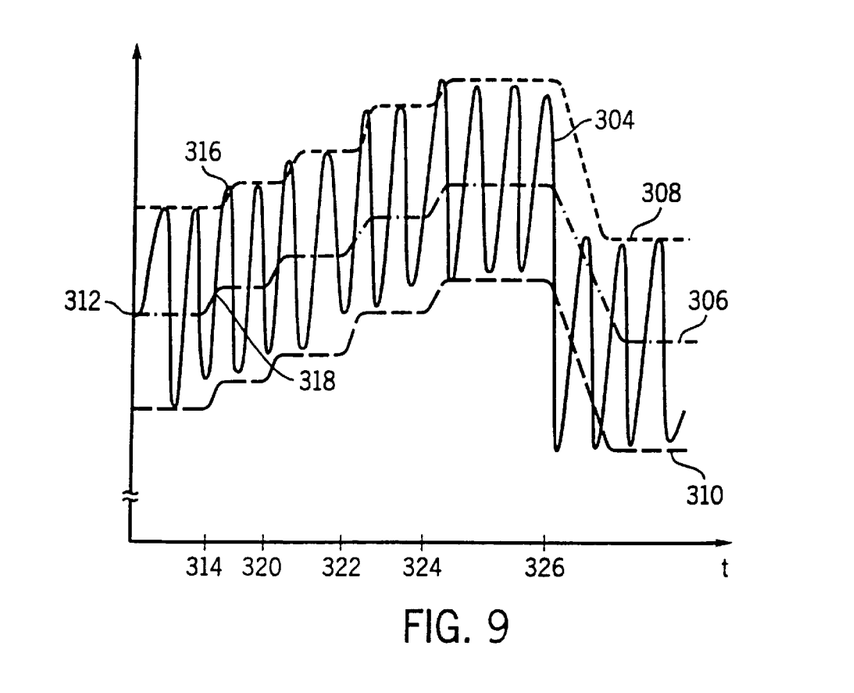
FIG. 9 shows the operation of a clutch valve in response to a valve command signal generated using the circuit of FIG. 6.

One should not infer from the term "constant voltage component" that the voltage is fixed, since as shown in the examples of FIGS. 7–9 the value changes, indeed must change in order to control the valve. The terms "constant" versus "fluctuating" were selected to more clearly indicate the differences between the two signal components that together comprise the valve command signal. See the sinusoidal fluctuations of fluctuating voltage component 304 of FIG. 9, as compared to the constant voltage component 306 of FIG. 9.

Referring back to FIG. 6, the constant voltage component of the signal is generated in the same manner as the signal in FIG. 4—microprocessor 36 generates a PWM signal that is subsequently time-averaged and applied to an input of an amplifier. Feedback is also applied to the amplifier to insure a constant voltage across the sense resistor.

The circuit shown in FIG. 6 replaces all the circuit elements in FIG. 4 between microprocessor 36 and nodes 224 and 226. Referring to the FIG. 6 embodiment, high speed output port 204 of microprocessor 36 is coupled to operational amplifier 282 at node 280. As in the example of FIG. 4, port 204 generates a PWM signal that can vary from 0% to 100% "on" time in up to 1000 pulse width increments. The period of the PWM signal is preferably about 0.5 to 5 milliseconds, more preferably about 1 millisecond. This signal is transmitted to summing op amp 284 which, in turn transmits its output signal at node 286 to the "+" input of op amp 285 and thence to node 224. Referring back to FIG. 4, the potential applied to node 224 is coupled to and drives switch 218. The "−" input of op amp 216 is coupled to node 226 (FIG. 4), at the sense resistor.

The circuit of FIG. 6 converts the PWM signal provided by high speed output port 204 of microprocessor 36 (FIG. 4) into the constant voltage component of the valve command signal. Capacitor 290 and resistor 292 are selected to form a first low pass filter at the input of op amp 282 to average the port 204 PWM signal. As a result, the output voltage of op amp 282 is substantially constant and proportionate to the "on" time of high speed output port 204. This constant voltage signal is provided to node 294 where it is added to the fluctuating voltage component of the valve command signal described in the following paragraph.

The fluctuating voltage component of the valve command signal is generated in the following manner. Node 296 of the FIG. 6 circuit is coupled to another port 295 of microprocessor 36 (FIG. 4) that generates a second PWM signal. If an Intel 80C198 microcontroller is used as microprocessor 36, the preferred port 295 for this signal is the "PWM" port provided on that integrated circuit at pin 28. The period of this second PWM signal is preferably between 0.01 and 0.1 milliseconds, more preferably about 0.032 milliseconds, for a frequency of 31.2 kHz. The 31.2 kHz PWM signal is further modulated under program control by varying the duty cycle of the second PWM signal at a dither frequency of between 50 and 1000 Hz, more preferably about 333 Hz.

The second PWM signal is coupled to node 296 (FIG. 6) which is coupled to a second operational amplifier 298 to amplify the second PWM signal. Capacitor 300 and resistor 302 comprise a low pass filter configured to remove the 31.2 kHz second PWM signal base frequency, while passing the preferably 333 Hz dithered component to op amp 298. As a result of this limited filtering, the output from op amp 298 fluctuates at the dither frequency.

Node 294 is where the constant voltage and fluctuating voltage components are combined. The output of operational amplifier 298 is coupled to the output of operational amplifier 282 at node 294 of the FIG. 6 circuit. Thus, the sum of the two signals is provided at the input of summing op amp 284, which amplifies the combined signals, the output of which is coupled to op amp 285.

This improved valve command signal causes a current to be generated in solenoid 220 (FIG. 4) that has a constant current component as well as a fluctuating current component.

The effect of the improved FIG. 6 circuit can be seen in FIG. 9, in which (as in FIG. 8) a line indicating a changing valve command signal is superimposed on a line indicating the position of the valve that is driven by that signal and is also inhibited from moving freely by friction. Line 304 in FIG. 9 represents the valve command signal. It has a constant voltage component as well as a fluctuating voltage component. Dashed and dotted line 306 represents the position of the valve, and dashed lines 308 and 310 indicate the upper and lower dead band limits.

At time 312, the valve command signal fluctuates between the upper and lower deadband limits. At time 314, the constant voltage component of the valve command signal is increased slightly by increasing the "on" time of high speed output port 204, and as a result, the signal peak 316 of the fluctuating valve command signal 304 exceeds the upper dead band limit. Since the valve command signal peak exceeds the upper dead band limit, the force applied to the valve spool overcomes the friction acting on the valve spool and the valve position changes slightly as seen at 318. Similarly, at times 320, 322 and 324, successive increases in the valve command signal also exceed the upper dead band limit, and the valve position again increases slightly. At time 326, the valve command signal decreases substantially, and the valve position decreases substantially in response. Note that in the FIG. 9 example that in spite of the valve friction, the valve position tracks relatively small changes in the valve command signal. By providing the fluctuating component to the valve command signal, even small changes in the valve's position can be effected, as compared with the valve response of FIG. 8.

It may be beneficial at times to change the amplitude of the fluctuating (dither) component of the valve command signal. For example, it may be beneficial to keep some valve spools constantly in motion. This can be provided by increasing the peak-to-peak amplitude of the fluctuating component of the valve command signal until it is greater than the width of the dead band of the valve. In this manner, the valve spool will move slightly back-and-forth with each cycle of the fluctuating component. The circuit of FIG. 6 is easily adapted to change the amplitude of the fluctuating current conducted through solenoid coil 220 under computer control. The fluctuating voltage provided at the output of op amp 298 can be increased by increasing the duty cycle of the dither of the second PWM signal. For example, to provide a fluctuating component of small amplitude, port 295 can be programmed to cycle between 40% and 60% "on" time. To provide a fluctuating component with a larger amplitude, the duty cycle range can be increased, for example from 30% to 70% or more.

It is understood that, while the detailed drawings, specific examples, and particular components values given describe preferred embodiments of the present invention, they serve the purpose of illustration only. The apparatus of the invention is not limited to the precise details and conditions disclosed. Further, although particular shapes and aperture dimensions have been shown, various other shapes, geometries and dimensions could be utilized for the various components of the system. By way of example, the governor could be a mechanical governor with an appropriate sensor to sense changes in governor rack position. The signal from such sensor would then be used to monitor engine loading during calibration. Other substitutions, modifications, changes and omissions may be made in the design, operating conditions and arrangement of the preferred embodiments without departing from the spirit of the invention as expressed in the appended claims.

What is claimed is:

1. In an agricultural vehicle comprising an engine, a governor coupled to the engine to regulate a fuel flow rate of the engine, a transmission coupled to the engine to couple power from the engine to the ground at a plurality of different gear ratios, the transmission having a drive train including a plurality of gears arranged on a plurality of shafts such that selective engagement of the gears allows the transmission to be engaged in a plurality of gear ratios, the drive train further including a plurality of fluid clutches arranged in the transmission to fix the gears to the shafts in the plurality of gear ratios, at least a first and second of the clutches being disposed to couple at least four of the gears with respect to at least two of the shafts to simultaneously engage the two shafts in two incompatible gear ratios, and a third of the clutches having an input and an output and disposed in drive train between the two clutches and the engine such that the third clutch can selectively engage the engine to at least one of the two shafts, the vehicle further including a plurality of fluid valves coupled to the plurality of clutches, a method for calibrating the third clutch, comprising the steps of:

engaging the first and second clutches to fix the at least two shafts in a plurality of incompatible gear ratios;

sensing a first value indicative of a reference engine load;

after the step of sensing a first value, incrementing a fluid pressure applied to the third clutch;

after the step of incrementing, sensing a second value indicative of a current engine load;

after the step of sensing a second value, comparing the first value and the second value to determine whether the current engine load exceeds the reference engine load by a predetermined amount, and repeating the incrementing, sensing a second value and comparing steps until the comparing step indicates that the current engine load exceeds the reference engine load by the predetermined amount.

2. The method of claim 1, wherein the step of sensing a second value includes the step of sensing a value indicative of a fuel flow rate to the engine.

3. The method of claim 1, further comprising the step of coupling the output of the third clutch to one of the at least two shafts.

4. The method of claim 3, further comprising the step of coupling the input of the third clutch to the engine.

5. The method of claim 1, wherein the step of incrementing a fluid pressure applied to the third clutch includes the step of changing a pulse width modulated command signal.

6. The method of claim 5, wherein the step of incrementing a fluid pressure applied to the third clutch further includes the step of changing a potential applied to a voltage follower circuit.

7. The method of claim 1, wherein the step of sensing a second value includes the step of sensing a value indicative of a speed of the engine.

8. The method of claim 7 wherein the step of sensing a value indicative of a speed of the engine includes relating pulsations produced by an alternator to a time interval.

9. An agricultural vehicle calibration system comprising:

an engine supplied with fuel to generate power;

a fuel flow rate sensor disposed to measure an amount of the fuel flowing to the engine and to generate a signal indicative thereof;

a clutch having a clutch input and a clutch output and adapted to transmit the power from the clutch input to the clutch output when engaged;

a load coupled to the clutch output;

a controller coupled to the fuel flow rate sensor and the clutch, wherein the controller is configured to incrementally engage the clutch until the clutch reaches a point of incipient engagement as indicated by the fuel flow signal.

10. The system of claim 9, wherein the controller is further configured to save a value indicative of the point of incipient engagement.

11. The system of claim 9 further comprising a governor configured to maintain the engine at a constant speed corresponding to a throttle setting whereby the governor causes an increase in fuel flow rate when the engine is loaded.

12. The system of claim 8 wherein the controller is coupled to the clutch through a circuit that produces a composite signal including a fluctuating voltage superimposed on a constant voltage whereby the fluctuating voltage compensates for valve friction.

13. The system of claim 12 wherein the circuit comprises:

a first low-pass amplifying circuit for receiving a control signal from the controller and providing a constant output;

a second low-pass amplifying circuit for receiving a modulated control signal from the controller and providing a fluctuating output; and a composite circuit for receiving the constant output and the fluctuating output and providing a summed output.

14. An agricultural vehicle comprising:

a frame;

an engine coupled to the frame;

a transmission coupled to the engine and further including,
a plurality of shafts;
a plurality of gears arranged on the shafts;
a plurality of clutches coupling the plurality of gears to the plurality of shafts; and a controller coupled to the plurality of clutches and configured to engage at least two of the plurality of shafts in mutually incompatible gear ratios, configured to subsequently and incrementally engage at least one of the plurality of clutches having an input coupled to the engine and an output coupled to the at least two shafts engaged in mutually incompatible gear ratios to a point of incipient engagement, and further configured to subsequently save a value indicative of the point of incipient engagement.

15. The vehicle of claim 14 further comprising a fuel flow sensor coupled to the controller and configured to generate a signal indicative of the point of incipient engagement.

16. The vehicle of claim 14 further comprising a governor coupled to the engine and the controller and configured to generate a signal indicative of the point of incipient engagement.

17. The vehicle of claim 14 wherein the controller is coupled to the plurality of clutches through at least one circuit that produces a composite signal including a fluctuating voltage superimposed on a constant voltage whereby the fluctuating voltage compensates for valve friction.

18. The vehicle of claim 14 wherein engaging the plurality of shafts in mutually incompatible gear ratios is done while at least one of a front gear box and a rear gear box is rotationally engaged to an output shaft of the transmission.

19. The vehicle of claim 14 wherein a decrease in revolutions per minute of the engine causes the controller to save the value indicative of the point of incipient engagement.

20. The vehicle of claim 19 wherein the decrease in revolutions per minute is determined by relating pulsations produced by an alternator to a time interval.

* * * * *